United States Patent
Chen

(10) Patent No.: US 7,793,123 B2
(45) Date of Patent: Sep. 7, 2010

(54) REDUNDANT POWER SUPPLY SYSTEM

(75) Inventor: Tsung-Chun Chen, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 682 days.

(21) Appl. No.: 11/826,325

(22) Filed: Jul. 13, 2007

(65) Prior Publication Data

US 2009/0019294 A1 Jan. 15, 2009

(51) Int. Cl.
*G06F 1/26* (2006.01)
(52) U.S. Cl. .............................. 713/300; 363/65; 714/2
(58) Field of Classification Search ................. 713/300; 363/65
See application file for complete search history.

(56) References Cited

U.S. PATENT DOCUMENTS

2006/0139975 A1    6/2006    Huang
2006/0273740 A1   12/2006    Saeueng et al.
2007/0076771 A1    4/2007    Fujimoto et al.

*Primary Examiner*—Nitin C Patel
(74) *Attorney, Agent, or Firm*—Muncy, Geissler, Olds & Lowe, PLLC

(57) ABSTRACT

A redundant power supply system aims to balance power supply among main power units and stationary power units to achieve optimum output quality for the main power units and stationary power units, and also prevent interruption of power supply resulting from any main power units or stationary power units. It includes a power integration control unit. The power integration control unit and the main power units and stationary power units are bridged respectively by a power balance unit which functions in a load power balance mode such that the power integration control unit outputs a total output power in power ON and standby conditions, and each power supply device delivers actual output power according to the load ratio of the power supply device.

6 Claims, 2 Drawing Sheets

REDUNDANT POWER SUPPLY SYSTEM

FIELD OF THE INVENTION

The present invention relates to a redundant power supply system and particularly to a redundant power supply system equipped with a power balance unit.

BACKGROUND OF THE INVENTION

The general electric equipments that need a great amount electric power such as industrial computers or computers used on aircrafts require a steady and reliable power supply due to they have to continuously process huge and complex information. To prevent abrupt loss of power supply or instant pulse resulting from switching to backup power that might damage the expensive electric equipments or cause instant loss of information under processing, a N+M redundant power supply system is generally adopted to maintain regular operation without interrupting the power supply. N represents the number of power supply devices assembled to meet total power loading requirement of the electric equipments. M represents the allowable number of power supply devices that can be out of service. $N \geq 1$ and $M \geq 1$. In the redundant power supply system that consists of N+M sets of power supply devices, each power supply device includes a stationary power unit to supply DC power constantly and a main power unit which outputs DC power in a power-ON condition. Many present redundant power supply systems also provide improved backup or fault tolerance function. For instance, U.S. patent application Ser. No. 11/022,795 discloses a redundant power supply having AC/DC input. Such a design of dual power sources input allows the DC power to be continuously delivered to electric equipments to maintain regular operation when any of the power input sources is interrupted.

The redundant power supply system mentioned above has main power units electrically coupled in a parallel fashion. Take a 1+1 redundant power supply system as an example. Theoretically, two main power units are set to evenly share the loading current to drive the electric equipments to operate regularly. But in practice, any of the main power units could be aged or encounter variation of output impedance that cause even sharing of the power not possible. To force them to evenly supply the same amount of power could cause overload of the main power unit. To maintain the regular operation of the electric equipments, another main power unit has to bear the total output power and becomes overloaded. This greatly shortens the life span of the redundant power supply system. To remedy this problem, a current sharing technique has been developed for the main power units. For instance, U.S. patent publication No. 20060273740 discloses such a technique. It provides an apparatus to detect output DC power and generate a feedback signal to the main power unit to regulate output power. Hence when an abnormal condition of output power of the main power unit is detected, the DC power to be output is controlled while another main power unit supplies a greater amount of DC power. As a result the main power units can be regulated to provide optimal power output. The life span of the redundant power supply system increases and damage resulting from abrupt conditions can be prevented. U.S. patent application Ser. No. 11/330,079 also discloses a Backup-type power supply system in which output power provided by the power supply system is integrated by different power supply modules according to different power levels. Each power supply device has an independent power balance unit to balance output power to achieve optimal power output at each power level. However, the balance mode for the output power set forth above mainly targets the main power units.

In addition to the main power units, the stationary power units in the redundant power supply system have to provide stationary power for the electric equipment during start and stop in the regular condition. As the electric equipments become more complex and require increasing amount of power, demand on the stationary power unit also increases. Moreover, lots of electric equipment these days adopts a technique to let the stationary power unit to function independently during the stop condition to support external electronic devices, such as lighting devices, small LCD devices and the like. All this application is performed without power ON of the electric equipments. As a result, the stationary power units also might encounter the condition of unbalanced power supply happened to the main power units previously discussed, and a forced and overloaded output power supply could shorten the life span of the standby power units. Power supply in the regular condition could also be impacted. Overload of the stationary power units could also result in abrupt power interruption. And the electronic elements in the electric equipments that rely on the power of the stationary power units could lose voltage instantly and be damaged.

SUMMARY OF THE INVENTION

Therefore the primary object of the present invention is to provide a redundant power supply system that can balance DC power output from main power units to achieve optimal output quality and also balance stationary power output from individual stationary power units that have increasing load so that total output power can be optimized. And power loss of important equipment can be avoided caused by interruption of any main power unit or stationary power unit.

To achieve the foregoing object, the redundant power supply system of the invention includes N+M sets of power supply devices, and $N \geq 1$ and $M \geq 1$. The power supply devices are electrically connected to at least one external power source to transform power output. The power supply devices have a power transformation unit inside that has at least one stationary power unit to provide stationary output power in regular conditions and a main power unit to provide power in a power ON condition. The power supply devices are jointly and electrically connected to at least one power integration control unit. The power integration control unit receives the transformed power output from the power supply devices and integrates power output. The power integration control unit and the stationary power unit and the main power unit are bridged respectively by a first power balance unit and a second power balance unit. The first power balance unit and the second power balance unit, in a load power balance mode, cause the power integration control units to output total power in the power On and standby conditions, and cause each power supply device to deliver actual output power according to the load ratio thereof.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
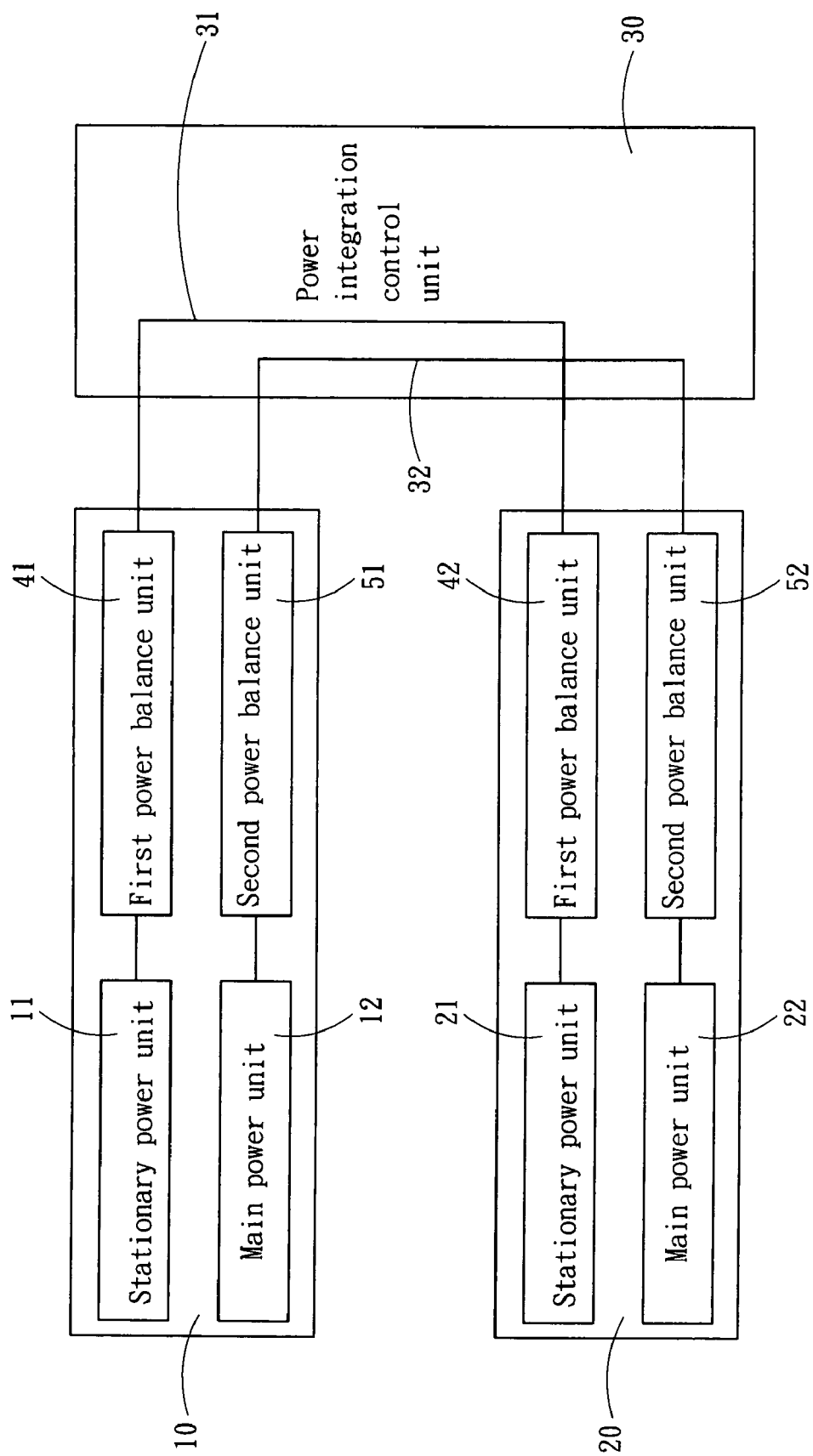
FIG. 1 is a circuit block diagram of the redundant power supply system of the invention.
Figure 2:
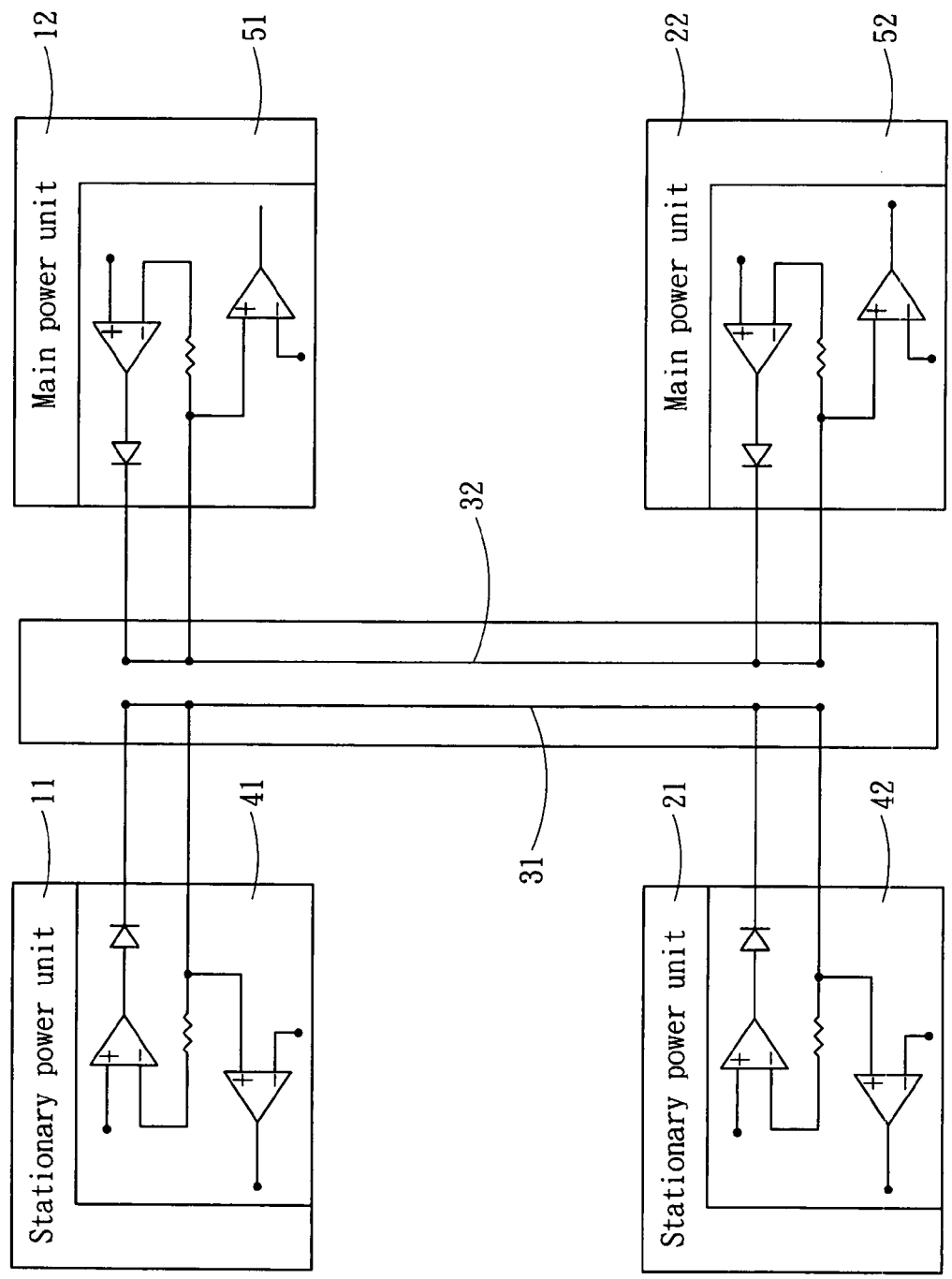
FIG. 2 is a circuit diagram of the redundant power supply system of the invention.

Please refer to FIGS. 1 and 2, the redundant power supply system of the invention has N+M sets of power supply devices 10 and 20, in which N≧1 and M≧1. N represents the number of the power supply devices 10 to meet total power load requirements for driving electric equipments. M represents the allowable number of the power supply devices 20 that can be out of service. The power supply devices 10 and 20 are connected to at least one external power source to transform power to be output. The power supply devices 10 and 20 have respectively a power transformation unit which includes at least a stationary power unit 11 and 21, and a main power unit 12 and 22. The stationary power units 11 and 21 are connected to the external power source during the power supply devices 10 and 20 in a standby mode to output the transformed power in regular conditions. The main power units 12 and 22 are connected to the external power source to output the transformed power in a power ON condition. The invention further has at least one power integration control unit 30 to be jointly and electrically connected to the power supply devices 10 and 20. The electric integration control unit 30 receives the transformed power output from the power supply devices 10 and 20, and integrates the power to be output. The power integration control unit 30 includes a first power inspection link 31 and a second power inspection link 32. The first power inspection link 31 is electrically connected to the stationary power units 11 and 21. The second power inspection link 32 is electrically connected to the main power units 12 and 22. Thereby the stationary power units 11 and 21 and the main power units 12 and 22 form respectively a small scale redundant power supply system. Overall speaking, the power supply devices 10 and 20 connected to the power integration control unit 30 integrate all the stationary power units 11 and 21, and the main power units 12 and 22 to form a large scale redundant power supply system.

To facilitate discussion, an embodiment with N=1 and M=1 is depicted as below. Namely the redundant power supply system has 1+1 sets of power supply devices 10 and 20.

In each of the power supply devices 10 and 20, the main power unit 12 and 22 and the power integration control unit 30 are bridged respectively by a first power balance unit 41 and 42. In the power ON condition, the main power units 12 and 22 transform power to DC power to pass through respectively the first power balance units 41 and 42. The first power balance units 41 and 42 initially are in a load power balance mode to inspect output power of the main power units 12 and 22, then control the main power units 12 and 22 through feedback, and make the main power units 12 and 22 to deliver actual output power according to a load ratio. The first power balance units 41 and 42 may be resided in the power supply devices 10 and 20, or the power integration control unit 30.

In addition, to ensure that the stationary power units 11 and 21 of the power supply devices 10 and 20 also can be regulated to output stationary power in a steady manner, the stationary power units 11 and 21 and the power integration control unit 30 also are bridged respectively by a second power balance unit 51 and 52. They function like the first power balance units 41 and 42 to the main power units 12 and 22. The second power balance units 51 and 52 also are in a load power balance mode to inspect total output power of the power integration control unit 30 in the regular conditions (including power ON and standby conditions), and make the stationary power units 11 and 21 to deliver actual output power according to another load ratio. The second power balance units 51 and 52 may be resided in the power integration control unit 30, or the power supply devices 10 and 20.

The main power and stationary power output by the redundant power supply system of the invention are regulated by the first power balance units 41 and 42 that regulate and control output power of the main power units 12 and 22, and by the second power balance units 51 and 52 that regulate and control output power of the stationary power units 11 and 21. Therefore the main power in the power ON condition and the stationary power in the regulation conditions can be output in an optimum quality, and overload of any of the main power units 12 and 22, or the stationary power units 11 and 21 can be prevented. Thus power supply interruption of the power supply devices 10 and 20 can be avoided, and power supply to the electric equipment can be maintained as desired.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A redundant power supply system, comprising:

N+M sets of power supply devices in which N≧1 and M≧1, the power supply devices being electrically connected to at least one external power source to transform power to be output, the power supply devices having a power transformation unit which includes at least one stationary power unit electrically connected to the external power source to output the transformed power in a standby condition of the power supply devices and at least one main power unit electrically connected to the external power source to output the transformed power in a power ON condition of the power supply devices;

at least one power integration control unit which is electrically connected to the power supply devices to receive the transformed power output from the power supply devices and integrate the transformed power to be output;

a first power balance unit bridging the stationary power unit and the power integration control unit to function in a load power balance mode such that the power integration control unit outputs a total power in the standby condition and each power supply device delivers actual output power according to a load ratio of the power supply device; and a second power balance unit bridging the main power unit and the power integration control unit to function in another load power balance mode such that the power integration control unit outputs the total power in the power ON condition and each power supply device delivers actual output power according to another load ratio of the power supply device.

2. The redundant power supply system of claim 1, wherein the first power balance unit is resided in the power integration control unit.

3. The redundant power supply system of claim 1, wherein the second power balance unit is resided in the power integration control unit.

4. The redundant power supply system of claim 1, wherein the first power balance unit is resided in the power supply device.

5. The redundant power supply system of claim 1, wherein the second power balance unit is resided in the power supply device.

6. The redundant power supply system of claim 1, wherein the stationary power unit is connected to the external power source when the power supply devices are in the power ON condition and controlled by the first power balance unit in the load power balance mode to output the transformed power.

* * * * *